United States Patent
Faber et al.

(10) Patent No.: US 8,197,289 B1
(45) Date of Patent: Jun. 12, 2012

(54) SELF-LOCKING POWER CONNECTOR

(75) Inventors: Timothy R. Faber, Marion, IA (US);
Richard K. Ruhberg, Cedar Rapids, IA (US)

(73) Assignee: Schneider Electric USA, Inc., Palatine (IL)

( * ) Notice: Subject to any disclaimer, the term of this patent is extended or adjusted under 35 U.S.C. 154(b) by 0 days.

(21) Appl. No.: 13/013,275

(22) Filed: Jan. 25, 2011

(51) Int. Cl.
*H01R 4/48* (2006.01)
(52) U.S. Cl. .................................................. 439/819
(58) Field of Classification Search .......... 439/819, 439/251, 249, 822; 200/828, 255
See application file for complete search history.

(56) References Cited

U.S. PATENT DOCUMENTS

| | | | |
|---|---|---|---|
| 1,978,246 A * | 10/1934 | Bauerschmidt | 200/255 |
| 3,201,556 A * | 8/1965 | Baird | 439/251 |
| 4,121,067 A * | 10/1978 | Rexroad et al. | 200/50.27 |
| 4,531,174 A | 7/1985 | Rickmann | |
| 5,036,427 A | 7/1991 | Krom et al. | |
| 5,098,318 A * | 3/1992 | Suter | 439/819 |
| 5,477,017 A | 12/1995 | Swindler et al. | |
| 6,066,814 A | 5/2000 | Smith et al. | |
| 6,777,627 B1 | 8/2004 | Stevenson | |
| 7,825,344 B2 | 11/2010 | Stevenson | |

OTHER PUBLICATIONS

"Cluster Retention Kits for Masterpact® NW Circuit Breakers"; Schneider Electric Instruction Bulletin No. 48049-897-05; 8 pages; May 2008.

* cited by examiner

*Primary Examiner* — Phuong Dinh

(57) ABSTRACT

Self-locking power connectors and circuit breaker assemblies with self-locking power connecters are presented herein. A self-locking power connector is disclosed for connecting a circuit breaker to an electrically conductive bus bar. The connector includes a cage and a cluster of electrically conductive fingers pivotably mounted to the cage. A lower end portion of each finger is configured to straddle the cluster support of the circuit breaker. Spring members bias the lower end portions of the fingers onto the cluster support. A retaining member is operatively engaged with the cage and one or more of the fingers. The retaining member is designed to inhibit a compressive force applied to the upper end portions of the fingers from overcoming the bias of the spring members and thereby separating the lower end portions of the fingers from the cluster support of the circuit breaker.

20 Claims, 16 Drawing Sheets

SELF-LOCKING POWER CONNECTOR

FIELD OF THE INVENTION

The present disclosure relates generally to power distribution devices and systems, and more particularly to connectors for connecting circuit breakers to power bus bars.

BACKGROUND

Large circuit breakers that carry thousands of amps of current are oftentimes installed into metal-enclosed switchgear assemblies (also called "switchboards"). Switchgears have large electrical conductors called bus bars (sometimes referred to as "buss bars") that carry current from a power source, such as a power utility, through the circuit breakers, to loads that are protected by the circuit breaker. These large circuit breakers, which can weigh hundreds of pounds, are typically lifted into the switchgear and racked by mounting the circuit breakers into a drawout cradle. A manually controlled or remotely operated handle mechanism is inserted into the cradle to turn a crank that racks the circuit breaker into the switchgear and completes an electrical circuit which is protected by the breaker.

On the backs of these large circuit breakers facing the rear interior of the switchgear cabinet are connection members, such as bus bars, with pivots (also known as "cluster supports") that jut out like rails on a train track. Onto these pivots are installed multiple "clusters," which are connectors that have opposing stacks of plate-like fingers that straddle the pivots and allow the clusters to adapt their positions to engage bus bars in the switchgear cabinets during the blind rack-in connection. These fingers are biased by spring elements to stay on the pivots so that the cluster "snaps" onto the pivot. It is important that these clusters remain secured on the pivots because if they become loose or dislodged as the circuit breaker is being racked into the switchgear or during operation of the switchgear, a dangerous cross-phase connection or a short circuit from an electrical phase to ground can occur, which can result in an explosive electrical arc.

Heretofore, various prior art approaches have been proposed for securing clusters to the pivots. For example, one current approach requires fastening the clusters to the pivots using a U-shaped retainer pin and a retainer clip. Another current approach requires securing a cage around a group of clusters to anchor them onto the pivots. These approaches for securing clusters to the pivots undesirably require additional installation time and labor due to additional parts and/or additional installation steps. What is needed is a solution that securely and reliably holds the clusters onto their pivots with minimal complexity, fewer parts, and reduced labor costs.

SUMMARY

A variety of exemplary configurations for the self-locking power connectors are presented. A first exemplary configuration includes a plurality of spring clips, which are interleaved with the fingers and configured to straddle the pivot. The spring clips have a leaf spring that provides a bias force that holds the spring clips on the pivot. The fingers, together with the spring clips, can be squeezed to overcome the bias force of the leaf spring, such that the cluster can be pressed onto or removed from the pivot.

In a second exemplary configuration, one or more sliding frame members are positioned between the cage and one or more of the fingers. The sliding frames have tabs designed to prevent the fingers from being urged apart, e.g., when a force is applied to the spring element. Each of the sliding frames can include a spring element, such as a leaf spring, that creates a bias force to retain the cage in the locked position. The sliding frames also have tabs configured to engage a tool that moves the sliding frames away from the pivot to allow the fingers to be separated such that the cluster can be pressed onto or removed from the pivot.

In a third exemplary configuration, the cage has a plurality of tabs that extend inwardly and pass between the fingers and the spring elements to prevent the fingers from being urged apart. The fingers in the third configuration can be tapered to create a bias force that pushes and holds the cage in the locked position. In some embodiments, to remove the cluster from the pivot includes using a tool to pull the cage away from the pivot, displacing the tabs to allow the fingers to separate such that the cluster can be removed from the pivot. The tapered surfaces on the fingers create a bias force on the cage to push it back down toward the locked position, thus creating a self-locking mechanism.

A fourth exemplary configuration comprises one or more pins, each of which extends along a respective stack of fingers of the cluster, and a spring element that biases the fingers against the pivot of a bus bar. The pins prevent the fingers from being urged apart, e.g., by a force applied to the spring element. In some embodiments, to remove the cluster from the pivot includes using a tool to grab the cage and pull it away from the pivot. The fingers can be tapered near the top of the cage to create a bias force that pushes and holds the cage in the locked position.

According to some aspects of the present disclosure, a self-locking power connector is presented for connecting a circuit breaker to an electrically conductive bus bar. The power connector includes a cage and a cluster of opposing pairs of electrically conductive fingers that are pivotably mounted to the cage. Each finger has opposing upper and lower end portions. The lower end portion of each finger is configured to straddle the cluster support of the circuit breaker. First and second spring members bias the lower end portions of the fingers toward one another. A retaining member is operatively engaged with the cage and the cluster of fingers. The retaining member is designed to inhibit a compressive force applied to the upper end portions of the fingers from overcoming the bias of the spring members and thereby urging apart the lower end portions of the opposing pairs of fingers.

According to other aspects of the present disclosure, a power connector is presented for electrically coupling a circuit breaker to an electrically conductive power bus bar. The power connector includes a cage with first and second opposing stacks of electrically conductive, asymmetric plates that are pivotably attached to the cage. Each plate has opposing first and second end portions. The first end portions are configured to attach to the cluster support of the circuit breaker, and the second end portions are configured to electrically mate with the bus bar. First and second biasing members are each engaged with a respective one of the stacks of plates. The first and second biasing members cooperatively bias the first end portions of the stacks of plates towards one another. A retaining member is engaged with the cage and the first and second stacks of plates. The retaining member inhibits the first end portions of the first and second stacks of plates from being urged away from one another.

The foregoing summary is not intended to represent each embodiment or every aspect of the present disclosure. Rather, the foregoing summary merely provides an exemplification of some of the novel features and aspects included herein. The above features and advantages, and other features and advantages of the present disclosure, will be readily apparent from the following detailed description of the embodiments and best modes for carrying out the present invention when taken in connection with the accompanying drawings and appended claims.

Figure 1:
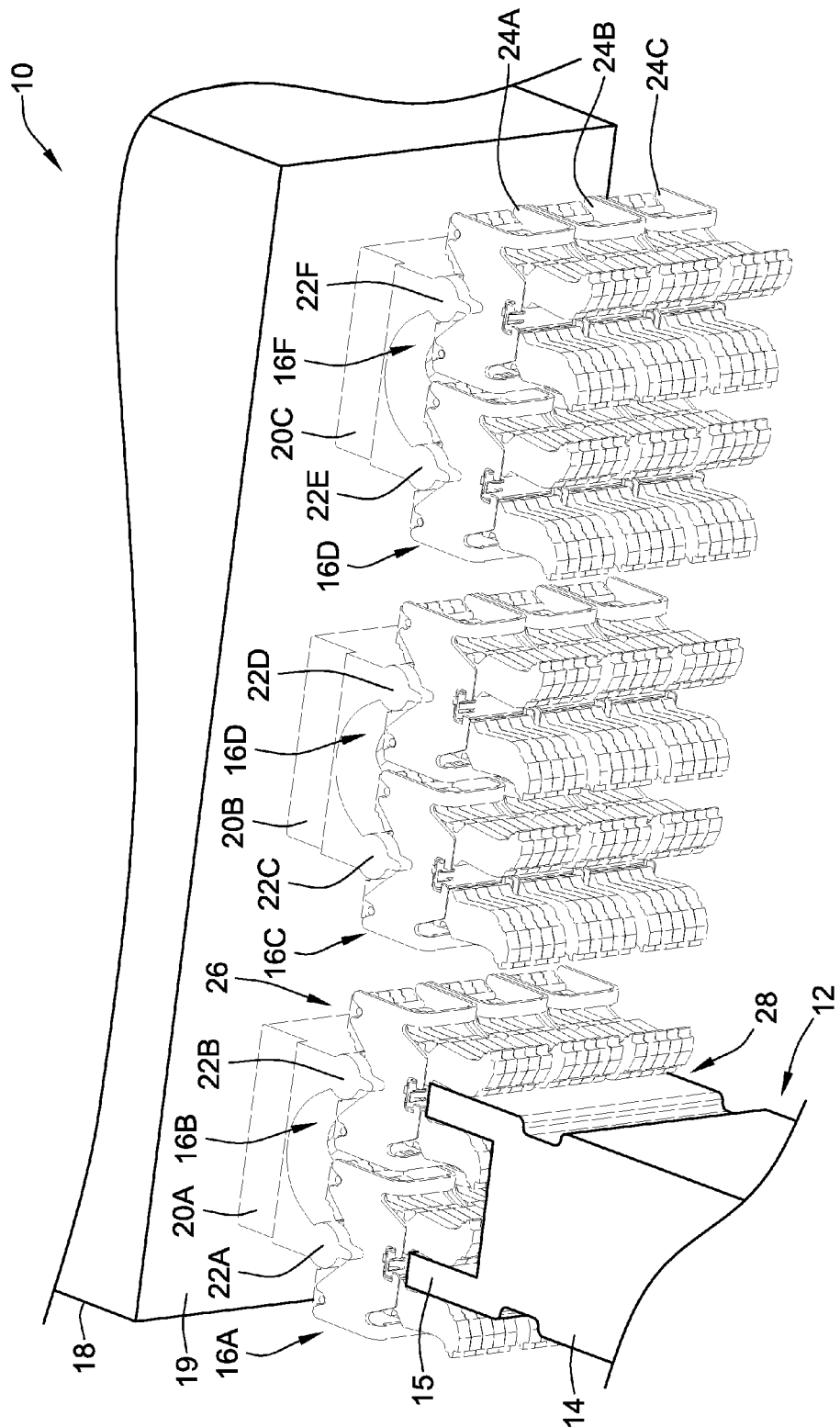
FIG. 1 is a perspective-view illustration of a representative circuit breaker assembly electrically coupled to a power bus bar of a representative switchgear assembly by an array of exemplary power connectors in accordance with aspects of the present disclosure.

While the present disclosure is susceptible to various modifications and alternative forms, specific embodiments have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of the invention as defined by the appended claims.

DETAILED DESCRIPTION

Referring now to the drawings, wherein like reference numerals refer to like components throughout the several views, FIG. 1 is a perspective-view illustration of a representative circuit breaker assembly, illustrated schematically at 10. The circuit breaker assembly 10 may be of the "draw-out type" voltage circuit breaker. A suitable circuit breaker assembly 10 can be based on the exemplary draw-out type circuit breakers disclosed, for example, in U.S. Pat. No. 5,036,427, to Thomas J. Krom et al., and U.S. Pat. No. 4,531,174, to Bernard C. Rickmann. In this regard, the circuit breaker assembly 10 can be conventionally mounted for movement into and out of a representative switchgear assembly, which is designated generally at 12 in FIG. 1, for connection to a plurality of electrical connectors. A representative racking device for racking draw-out type circuit breakers into a switchgear cell is disclosed, for example, in U.S. Pat. No. 5,477,017, to David L. Swindler et al. While the illustrated embodiment is shown as a switchboard apparatus, it should be understood that the aspects of the present disclosure could be embodied in other types of electrical apparatuses.

In the illustrated embodiment, the circuit breaker 10 is electrically coupled by an array of power connectors 24A-C to one or more electrically conductive power bus bars 14 of the switchgear assembly 12. When properly connected, the breaker 10 can be operable to distribute power from a primary power source, such as a standard utility power source, to a load. The circuit breaker assembly 10 includes, for example, a housing 18 with a rearward facing wall 19. Three substantially identical cluster support bars 20A-C are fixed to the rearward facing wall 19 of the circuit breaker housing 18. Integrally formed with each cluster support bar 20A-C is a pair of laterally spaced, spade-shaped pivots 22A-F. The pivots 22A-F are vertically elongated rails that project generally orthogonally from the rearward facing wall 19 of the circuit breaker housing 18. It should be understood that the drawings are not necessarily to scale and are provided purely for descriptive purposes; thus, the individual and relative dimensions and orientations of the drawings presented herein are not to be considered limiting. To that end, the circuit breaker 10 can include greater or fewer than three cluster support bars 20A-C of similar or differing structure to that shown in the drawings.

In FIG. 1, the array of power connectors comprises six columns 16A-F of self-locking "cluster-type" power connectors. Each column 16A-F includes three substantially identical power connectors 24A-C (i.e., 18 total connectors in the illustrated embodiment) that are stacked vertically one on top of the other. As described in further detail below, each power connector, e.g., 24A-C, has a first ("lower" or "breaker-side") end portion, designated generally as 26 in FIG. 1, opposing a second ("upper" or "bus-side") end portion, designated generally as 28. The first end portions 26 are designed to attach to (e.g., seat on and straddle) one of the spade-shaped pivots 22A-F of the cluster supports 20A-C. The second end portions 28, in contrast, are designed to electrically mate with (e.g., interference-fit and clamp onto) one of the power bus bars 14.

Figure 2:
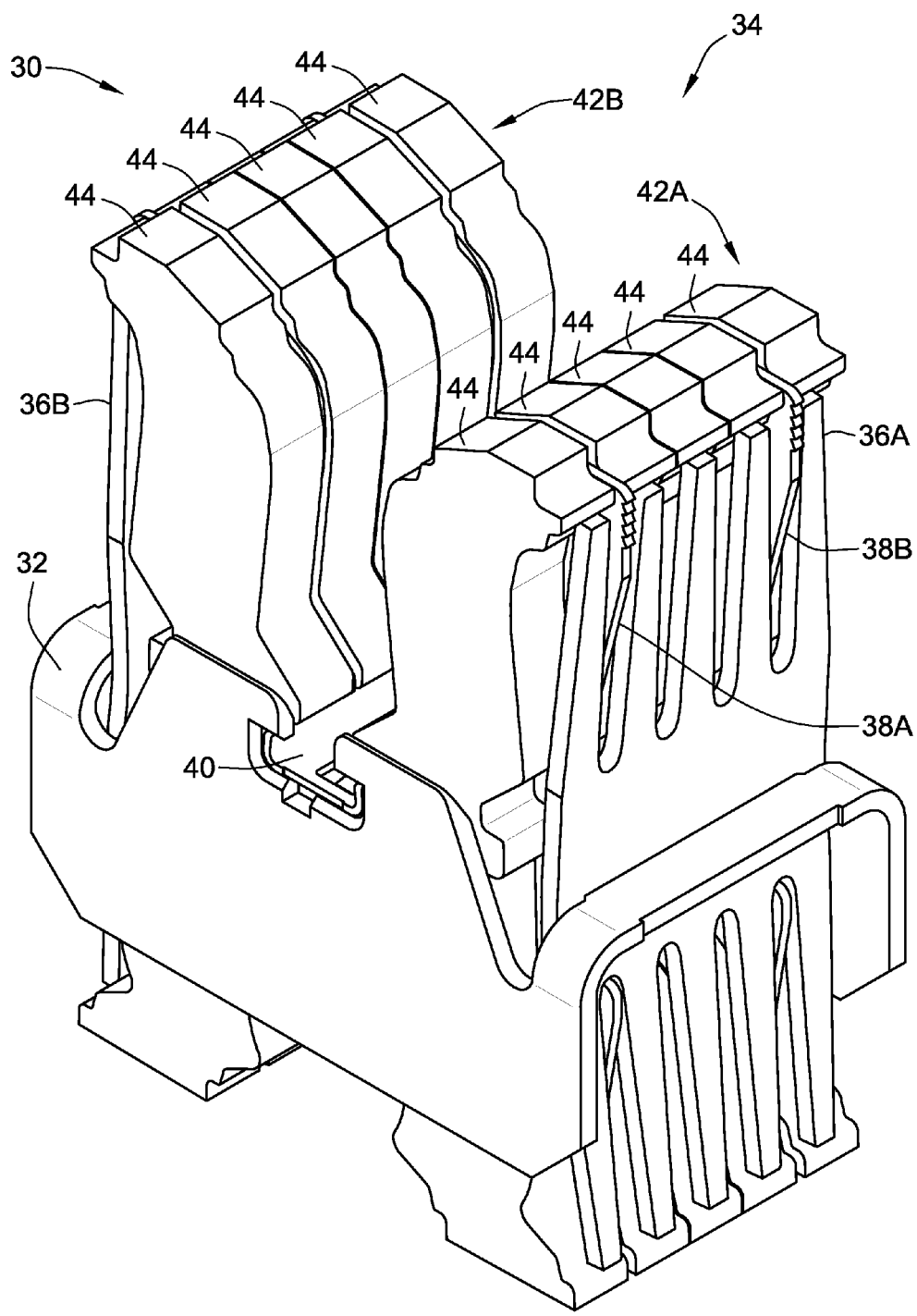
FIG. 2 is a perspective-view illustration of an exemplary self-locking power connector in accordance with aspects of the present disclosure.
Figure 3:
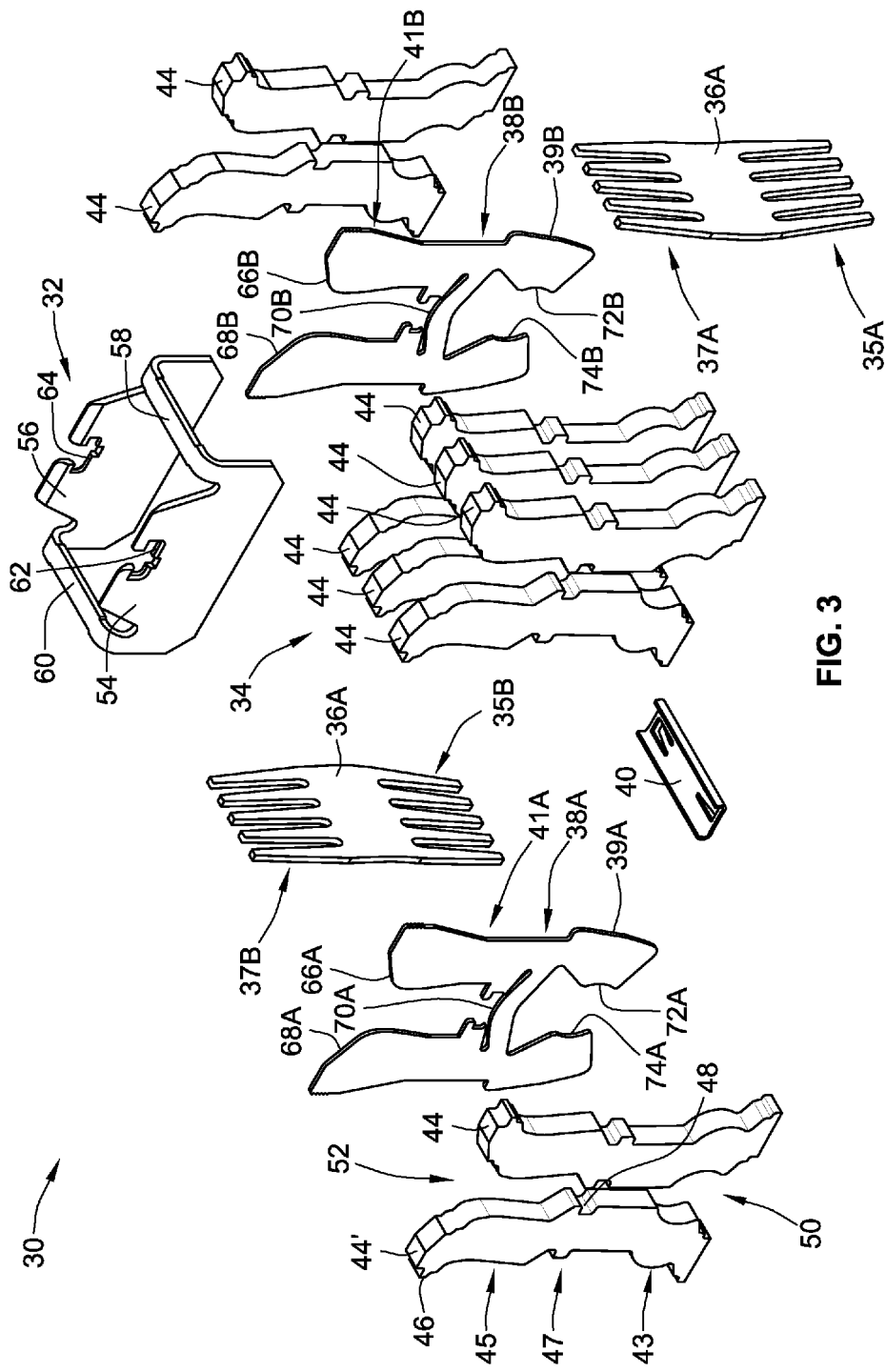
FIG. 3 is an exploded perspective-view illustration of the self-locking power connector of FIG. 2.

FIGS. 2 and 3 illustrate an exemplary power connector, indicated generally at 30, in accordance with aspects of the present disclosure. According to the illustrated embodiment, the power connector 30 includes a cage 32, a finger cluster, which is designated generally as 34, one or more dual-fork-shaped leaf springs 36A and 36B, one or more retaining members 38A and 38B, and an elongated, U-shaped spacer 40. The cluster 34 generally includes first and second opposing stacks 42A and 42B, respectively, of electrically conductive, elongated, asymmetric plates 44 (also referred to herein as "fingers"). The plates 44 can be mated in opposing pairs and pivotably mounted to the cage 32, for example, via spacer 40.

In some embodiments, the plates 44 are substantially structurally identical; as such, the plates 44 will be collectively described herein with respect to a single plate 44' shown on the far-left of FIG. 3. However, in alternate configurations, the plates 44 may be individually or collectively varied in shape and size from that which is shown in the drawings. Each plate 44' can be a single-piece, monolithic structure that is fabricated (e.g., stamped) from an electrically conductive material, such as aluminum or copper. The plate 44' has a first ("lower") end portion 43 opposing a second ("upper") end portion 45, the end portions 43, 45 being interconnected by a middle portion 47, which is generally located between the two end portions 43, 45. A tab 46 projects laterally outward from the second end portion 45 such that the tab 46 can be received in and mate with a tool (not shown in FIG. 3). As described below, the tool applies a compressive force to the upper end portions 45 of the opposing pairs of fingers 44, which acts to separate the first end portions 43 such that the power connector 30 can be attached to and detached from the circuit breaker 10. In addition, each of the middle portions 47 includes a notch 48; when mated in opposing pairs, the notches 48 cooperatively define an elongated channel within which is received the spacer 40. The spacer 40, in turn, is attached to the cage 32 as described below to thereby pivotably mount the first and second opposing stacks of plates 42A and 42B to the cage 32.

As noted previously, the power connector 30 is designed to electrically connect an electrical switch, such as circuit breaker 30 of FIG. 1, to an electrical conductor, such as power bus bar 14 of FIG. 1. The first "lower" end portion 43 of each plate 44', for example, is configured to attach to a cluster support 20A-C of the circuit breaker 10, whereas the second "upper" end portion 45 of each plate 44' is configured to electrically mate with the bus bar 14. By way of non-limiting example, the lower end portions 43 of each mating pair of opposing fingers 44' are shaped to cooperatively define a spade-shaped channel (generally designated by reference numeral 50 in FIG. 3) with the same general longitudinal profile as the spade-shaped pivots 22A-F of the circuit breaker 10. In so doing, the first end portions 43 can securely seat on and straddle one of the cluster supports 20A-C of the circuit breaker 10. In a similar regard, the upper end portions 45 of each mating pair of opposing fingers 44' are shaped to cooperatively define a channel (generally designated by reference numeral 52 in FIG. 3) with a complementary longitudinal profile for receiving one of the tangs 15 of the bus bar 14. Thus, when the circuit breaker 10 is racked and moved into the switchgear assembly 12, the upper end portions 45 press-fit and clamp onto one of the tangs 15 of the power bus bars 14, as illustrated in FIG. 1.

With continuing reference to FIG. 2, the cage 32 of the illustrated connector 30 acts as a functional sleeve or casing, extending generally continuously around the outer perimeter of the cluster 34 to thereby maintain the fingers 44 in their respective stacks 42A, 42B. The cage 32 can be a single-piece, monolithic structure that is fabricated (e.g. stamped) from a structurally appropriate, non-magnetic material, such as brass or stainless steel. The cage 32 includes first and second opposing, generally flat end walls 54 and 56, respectively, that are attached together via first and second elongated connecting arms 58 and 60, respectively, that extend between and are generally perpendicular to the end walls 54, 56. The two stacks of fingers 42A, 42B nest within the cage 32, as seen in FIG. 2, with a first ("forward-most") pair of fingers laying generally parallel to and flat against the first end wall 54, and a second ("rearward-most") pair of fingers laying generally parallel to and flat against the second end wall 56. Each of the end walls 54, 56 includes a respective window 62 and 64. When assembling the connector 30, the first and second stacks 42A, 42B are positioned inside the cage 32 and oriented such that the notches 48 align to cooperatively define a channel, which is then lined up with the windows 62, 64. The spacer 40 is then inserted through one of the windows 62, 64, through the notches 48 between the opposing stacks of fingers 42A and 42B, to the other window 62, 64. In this manner, the spacer 40 pivotably attaches the fingers 44 to the cage 32 and maintains a space between the stacks of fingers 42A and 42B.

The first and second leaf springs 36A, 36B (also referred to herein as "biasing members") cooperatively bias the first end portions 43 of the pivotably mounted stacks of plates 42A, 42B laterally inwardly towards one another. By way of example, and not limitation, the first dual-fork-shaped leaf spring 36A is interleaved between the cage 32 and the first stack of fingers 42A, whereas the second dual-fork-shaped leaf spring 36B is interleaved between the cage 32 and the second stack of fingers 42B. A first ("lower") end portion 35A of the first leaf spring 36A presses against the first end portions 43 of the first stack of fingers 42A, while a second ("upper") end portion 37A of the first leaf spring 36A presses against the second end portions 45 of the first stack of fingers 42A. The first dual-fork-shaped leaf spring 36A is pinned within the cage 52, bowed inwardly by and pivoting about the inside edge of the first connecting arm 58. In a similar respect, a first ("lower") end portion 35B of the second leaf spring 36B presses against the first end portions 43 of the second stack of fingers 42B, while a second ("upper") end portion 37B of the second leaf spring 36B presses against the second end portions 45 of the second stack of fingers 42B. The second dual-fork-shaped leaf spring 36B is pinned within the cage 52, bowed inwardly by and pivoting about the inside edge of the second connecting arm 60. The connecting arms 58, 60 are longitudinally offset with respect to the leaf springs 36A, 36B (e.g., are positioned closer to the first "lower" end portions 35A, 35B of the leaf springs 36A, 36B than the second "upper" end portions 37A, 37B of the leaf springs 36A, 36B), and the pivot point (e.g., the spacer 40) of the opposing finger stacks 42A and 42B. This acts to create a moment arm on the leaf springs 36A, 36B such that the leaf springs 36A, 36B bias the lower end portions 43 of the fingers 44 are inwardly (e.g., onto a cluster support 22).

The power connector 30 can be self-locking in that it can achieve and maintain a locked position without external features. For example, the power connector 30 can provide "fastener grade" retention without using additional fasteners, clamps, or other separate attachment means, which requires fewer parts, reduces complexity, and reduces labor costs. In the exemplary embodiment of FIGS. 2 and 3, the power connector 30 includes a pair of retaining members 38A, 38B, each of which is operatively engaged with the cage 32 and one or more of the fingers 44. The retaining members 38A, 38B are designed to inhibit a compressive force applied to the upper end portions 45 of the opposing pairs of fingers 44 from separating the lower end portions 43 of the fingers 44 thereby hampering inadvertent removal of the connector 30 from the cluster support bar 20A-C. Each of the retaining members 38A, 38B in FIGS. 2 and 3 is a substantially flat, butterfly-shaped spring clip, which thus may be referred to hereinafter as "spring clip." These spring clips 38A, 38B can be positioned between an end surface of one or more fingers 44 and an inner surface of the end walls 54, 56 of the cage 32. The first spring clip 38A includes first and second opposing wings 66A and 68A, respectively, that are attached together via an elongated leaf spring 70A, which extends from the first wing 66A, across the gap between the opposing stacks of fingers 42A, 42B, to the second wing 68A. The second spring clip 36B, like the first clip 38A, includes first and second opposing wings 66B and 68B, respectively, that are attached together via an elongated leaf spring 70B that extends across the gap between the opposing stacks of fingers 42A, 42B from the first wing 66B to the second wing 68B.

The first and second spring clips 36A, 36B, by way of the leaf springs 70A, 70B, inhibit or otherwise prevent the lower finger portions of the fingers 44 from being readily urged laterally away from one another. In particular, each wing 66A, 68A, 66B, 68B is interposed between one or more of the fingers 44. A first ("lower") end portion 39A and 39B of each clip 38A, 38B, respectively, is configured to straddle one of the cluster supports 22A-F and thereby help attach the spring clip 38A, 38B to the circuit breaker 10. Specifically, the lower end of each wing 66A, 68A of the first spring clip 38A defines a semi-circular gripping cup 72A and 74A, respectively. Likewise, the lower end of each wing 66B, 68B of the second spring clip 38B defines a semi-circular gripping cup 72B and 74B, respectively. When the connector 30 is properly positioned on a respective cluster support 22A-F, each gripping cup 72A, 74A, 72B, 74B is biased against a respective opposing side of one of the spade-shaped pivots 22A-F by a corresponding leaf spring 70A, 70B such that the spring clip 38A, 38B attaches to the pivots 22A-F. Second ("upper") end portions 41A and 41B of each clip 38A, 38B, respectively, are positioned such that a compressive force applied to the upper ends 45 of the opposing stacks 42A and 42B of fingers 44 also presses against the upper end portions 41A, 41B of the clips 38A, 38B. Responsively, the leaf springs 70A, 70B generate a reactive spring force that at least partially counteracts the applied compressive force, which prevents the cluster fingers 44 from moving in the direction necessary for removal from the pivot 22E-F. The spring clips 38A, 38B in effect create an additional biasing force that increases the threshold compressive force necessary to remove the cluster 34 from the pivot 22A-C. In addition, because the spring clips 38A, 38B bear directly on the bus bar 20A-C, the spring element is generally only solicited in tension for which it can create larger retention forces on the pivot, which can render the cluster generally "unremoveable" during buss extraction.

Figure 4:
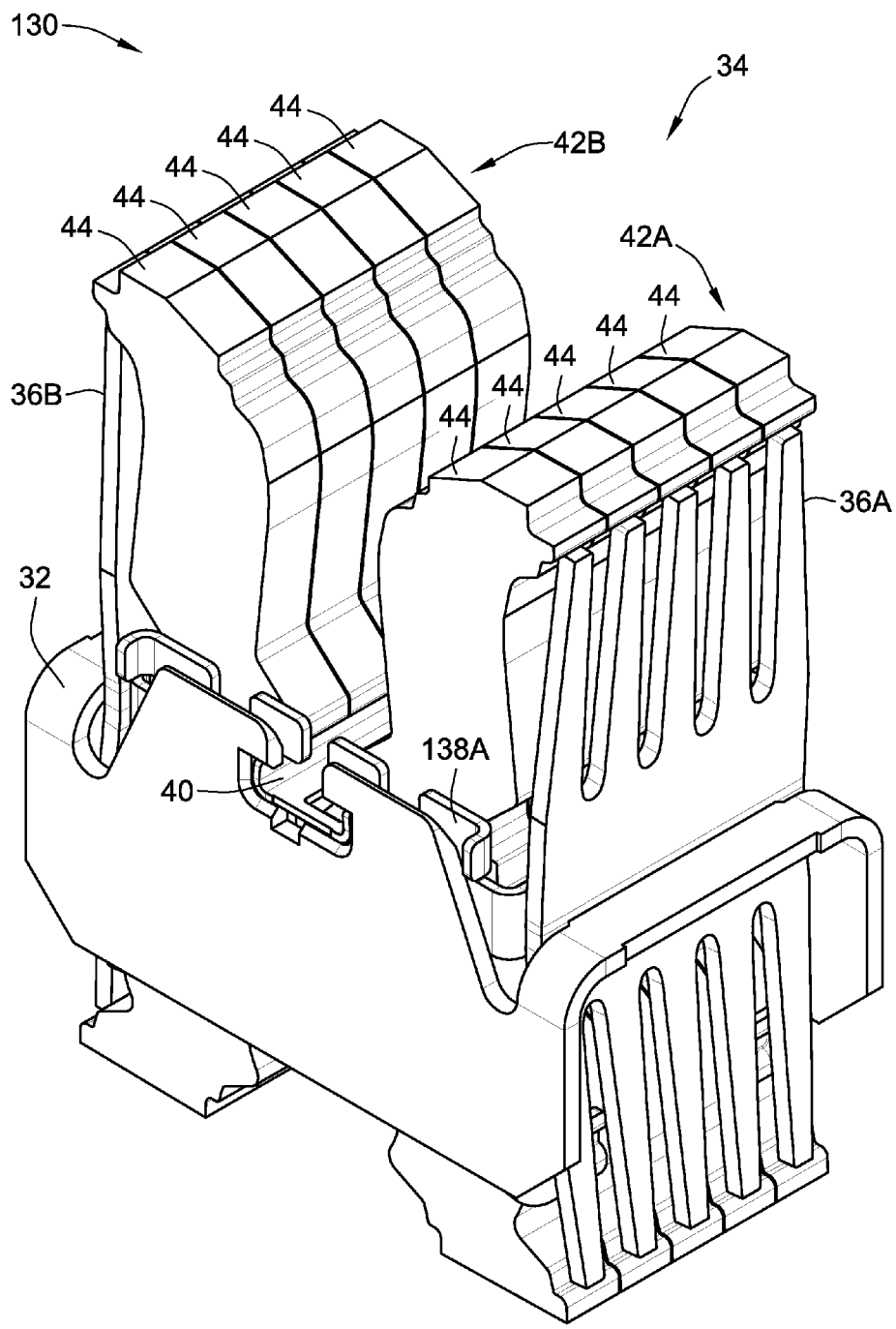
FIG. 4 is a perspective-view illustration of another exemplary self-locking power connector in accordance with aspects of the present disclosure.
Figure 5:
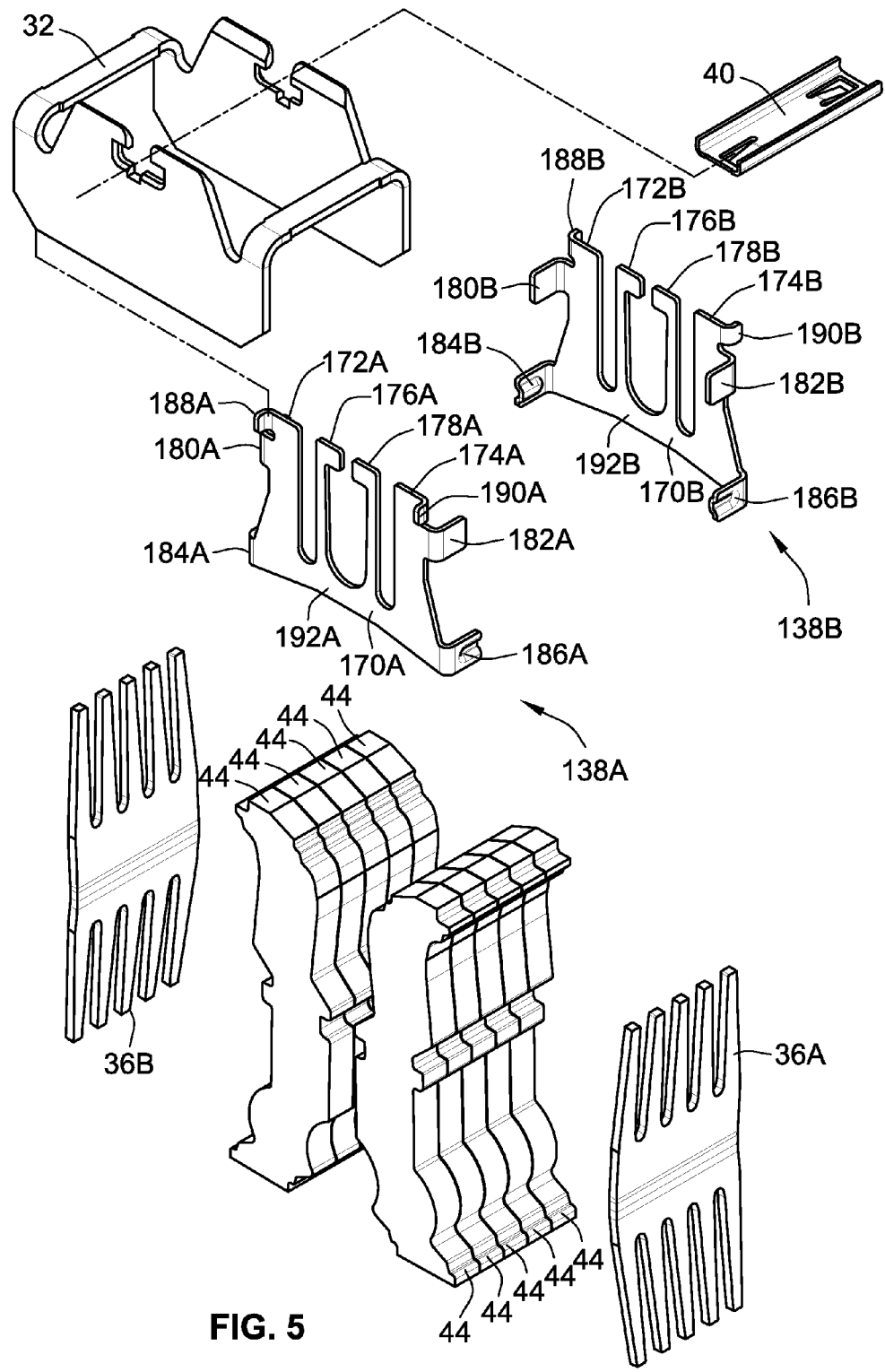
FIG. 5 is an exploded perspective-view illustration of the self-locking power connector of FIG. 4.

Turning next to FIGS. 4 and 5, wherein like reference numerals refer to like components from FIGS. 2 and 3, an exemplary power connector, indicated generally at 130, is presented in accordance with aspects of the present disclosure. The power connector 130 includes a cage 32, a finger cluster, which is designated generally as 34, one or more dual-fork-shaped leaf springs 36A and 36B, one or more retaining member 138A and 138B, and an elongated, U-shaped spacer 40. In the embodiment illustrated in FIGS. 4-7, the cage 32, cluster 34 (including the stacks 42A, 42B of fingers 44), leaf springs 36A, 36B, and spacer 40 can be structurally and functionally identical to the cage 32, cluster 34, leaf springs 36A, 36B, and spacer 40 of FIGS. 2 and 3. Therefore, for brevity and conciseness, these components will not be described again in detail. In alternative configurations, however, the cage 32, cluster 34, leaf springs 36A, 36B, and spacer 40 can be individually or collectively varied in structure and/or function.

The power connector 130 can be self-locking in that it can achieve and maintain a locked position without external features. For example, the power connector 130 can provide "fastener grade" retention without using fasteners, clamps, or other separate attachment means, which requires fewer parts, reduces complexity, and reduces labor costs. In the exemplary embodiment of FIGS. 4-7, the power connector 130 includes a pair of retaining members 138A, 138B (see FIG. 5), each of which is operatively engaged with the cage 32 and one or more of the fingers 44. The retaining members 138A, 138B are designed to prevent a compressive force applied to the upper end portions 45 of the opposing pairs of fingers 44 from separating the lower end portions 43 of the fingers 44, thereby hampering inadvertent removal of the connector 30 from the cluster support bar 20A-C. Each of the retaining members 138A, 138B is a generally flat frame that is slidably inserted between the cage 32 and one or more of the fingers 44 (the retaining members 138A, 138B also referred to herein as "frames"). In some embodiments, the first and second frames 138A, 138B are substantially structurally identical. For example, the first slidable frame 138A has a base 170A that extends transversely with respect to the stacks 42A, 42B of fingers 44, and a plurality of arms 172A, 174A, 176A and 178A that are laterally spaced from one another, extending generally orthogonally from the base 170A. Likewise, the second slidable frame 138B has a base 170B that extends transversely with respect to the stacks 42A, 42B of fingers 44, and a plurality of arms 172B, 174B, 176B and 178B that are laterally spaced from one another, extending generally orthogonally from the base 170B.

With collective reference to FIGS. 4-7, the first and second slidable frames 138A, 138B inhibit or otherwise prevent the lower portions of the fingers 44 from being readily urged laterally away from one another, e.g., when a compressive force is applied to the upper end of the connector 130. By way of non-limiting example, a variety of tabs protrude from the ends of the arms 172A, 174A, 176A, 178A and 172B, 174B, 176B, 178B of the first and second slidable frames 138A, 138B. Specifically, first and second tabs 180A and 182A, respectively, project generally perpendicularly from the first and second arms 172A, 174A of the slidable frame 138A, extending between a respective one of the dual-fork-shaped leaf springs 36A, 36B and one or more of the fingers 44. When the frame 138A is operatively oriented, the first and second tabs 180A, 182A are positioned adjacent the middle portion 47 of the fingers 44. Similarly, third and fourth tabs 184A and 186A, respectively, project generally perpendicularly from the opposite sides of the base 170A, extending between a respective one of the leaf springs 36A, 36B and one or more of the fingers 44. When the frame 138A is operatively oriented, the third and fourth tabs 184A, 186A are positioned adjacent the bottom portion 43 of the fingers 44.

First and second tabs 180BA and 182B, respectively, project generally perpendicularly from the first and second arms 172B, 174B of the slidable frame 138B, extending between a respective one of the dual-fork-shaped leaf springs 36A and 36B and one or more of the fingers 44. When the frame 138B is operatively oriented, the first and second tabs 180B, 182B are positioned adjacent the middle portion 47 of the fingers 44. Third and fourth tabs 184B and 186B, respectively, project generally perpendicularly from the opposite sides of the base 170B, extending between a respective one of the leaf springs 36A and 36B and one or more of the fingers 44. When the frame 138B is operatively oriented, the third and fourth tabs 184B, 186B are positioned adjacent the bottom portion 43 of the fingers 44.

Figure 6:
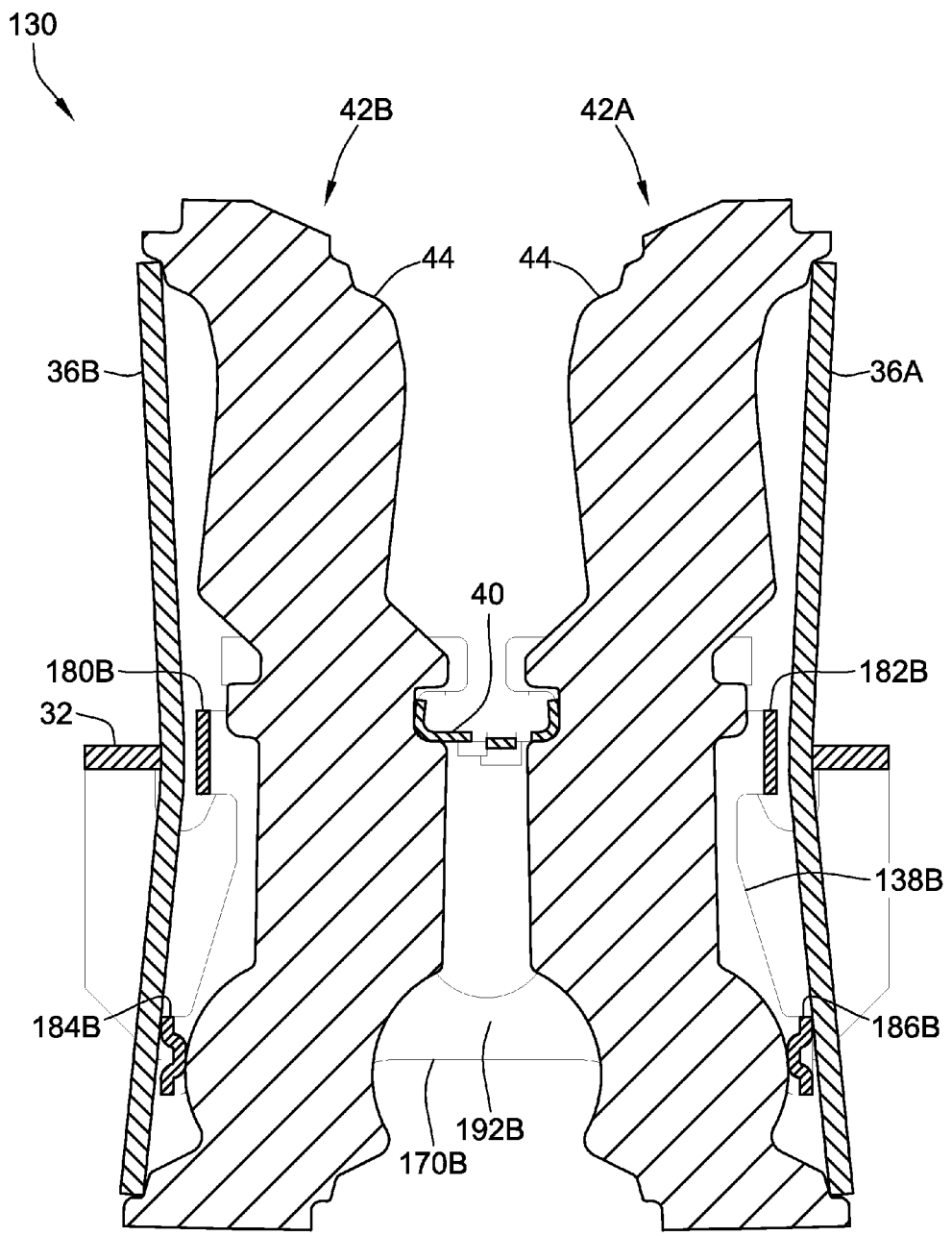
FIG. 6 is a front-view illustration of the self-locking power connector of FIG. 4 shown in partial cross-section with a slidable retention frame in a locking position.
Figure 7:
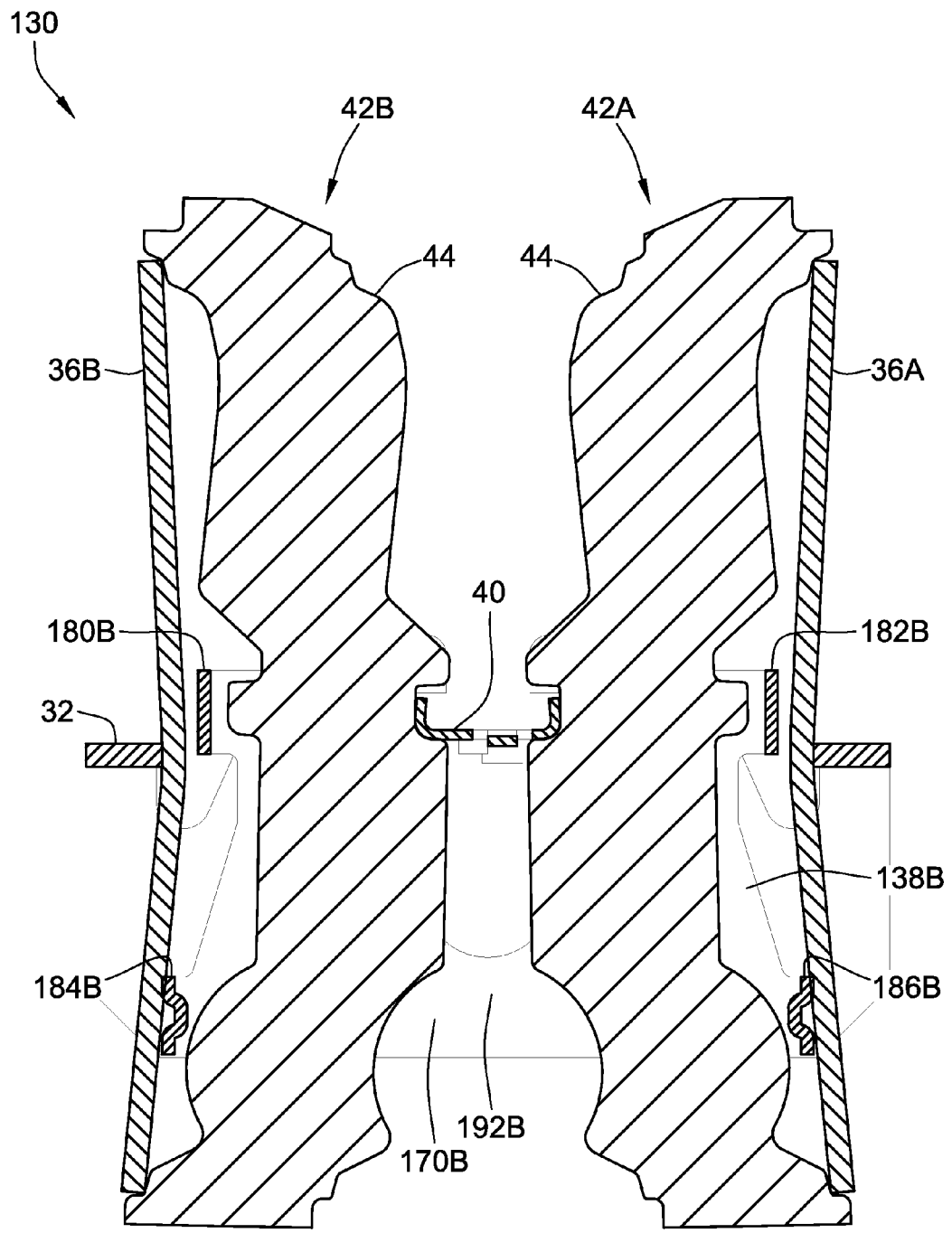
FIG. 7 is a front-view illustration of the self-locking power connector of FIG. 4 shown in partial cross-section with the slidable retention frame in an unlocking position.

The first and second slidable frames 138A, 138B are slidable between a locking position, illustrated for descriptive purposes in FIG. 6, and an unlocking position, illustrated for descriptive purposes in FIG. 7. In some embodiments, each of the slidable frames 138A, 138B can include a leaf-spring portion 192A and 192B, respectively, that creates a bias force that urges the frames 138A, 138B "downwardly" into the locked position. When in their respective locking positions, as seen in FIG. 6, the tabs 184A, 186A, 184B, 186B of the first and second slidable frames 138A, 138B wrap around one or more of the fingers 44 and obstruct movement of the lower end portions 43 of one or more of the fingers 44. In essence, the frames 138A, 138B act like clamps that press together the lower ends of the first and second stacks 42A, 42B of fingers 44. In addition, the first frame 138A has a set of tool-engaging tabs 188A and 190A that project from the ends of the arms 172A, 174A, extending away from the interior of the cage 32. Like the first frame 138A, the second frame 138B has a set of tool-engaging tabs 188B and 190B that from the ends of the arms 172B, 174B, extending away from the interior of the cage 32. The first and second sets of tool-engaging tabs 188A, 190A, 188B, 190B are shaped and oriented to mate with a tool, which is operable to concomitantly slide the first and second frame 138A, 138B to their respective unlocking positions—e.g., in a direction away from the pivot, to allow the fingers to be separated such that the cluster can be pressed onto or removed from the spade-shaped pivot (e.g., 22A-F of FIG. 1). When the frames 138A, 138B are moved to their respective unlocking positions, as seen in FIG. 7, the tabs 184A, 186A, 184B, 186B are displaced away from the pivot or "upwardly" with respect to the illustrative drawings, thereby allowing the lower end portions 43 of the fingers 44 to be urged apart, e.g., via a compressive force applied to the upper end portions 45 of the fingers 44.

Figure 8:
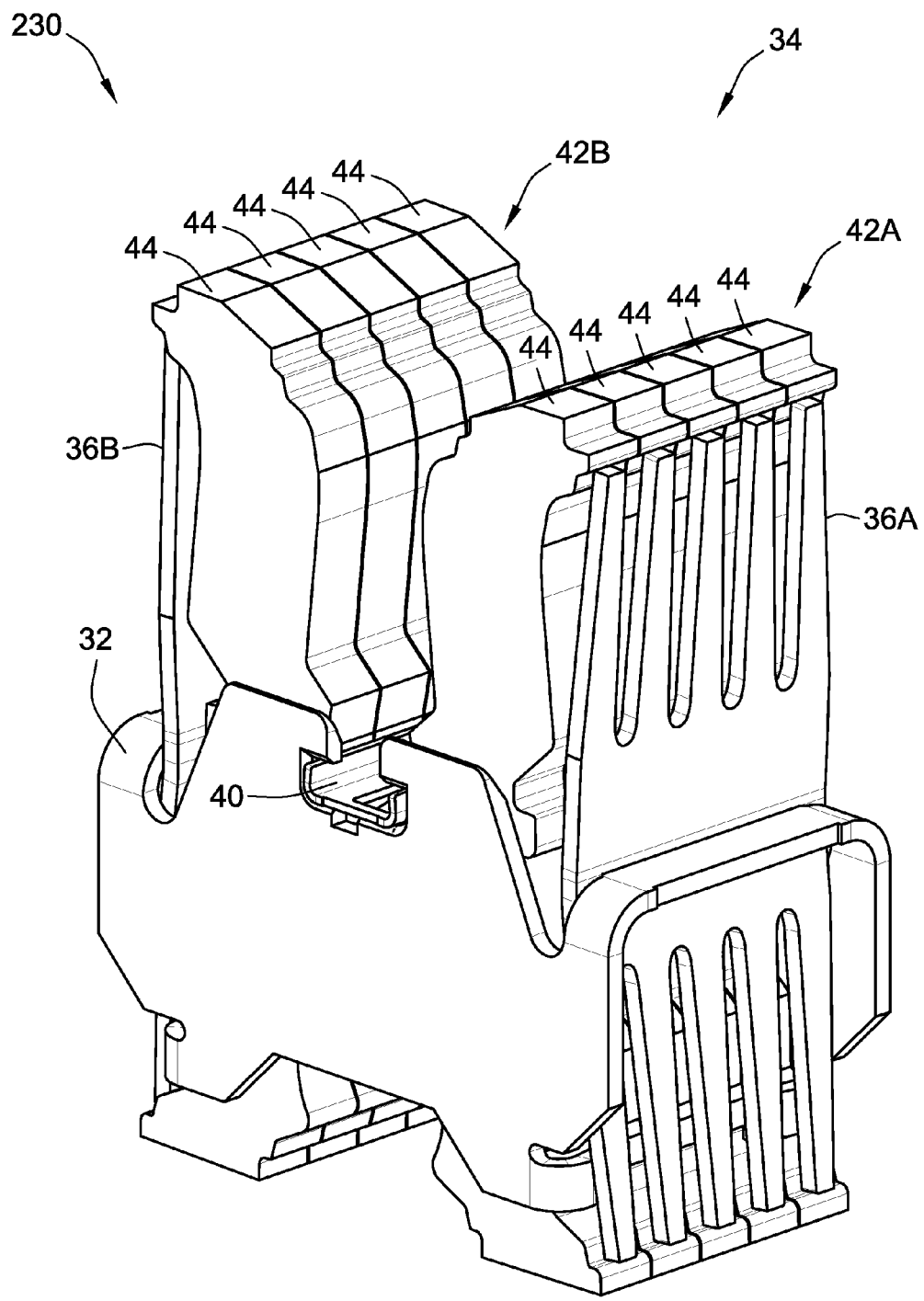
FIG. 8 is a perspective-view illustration of another exemplary self-locking power connector in accordance with aspects of the present disclosure.
Figure 9:
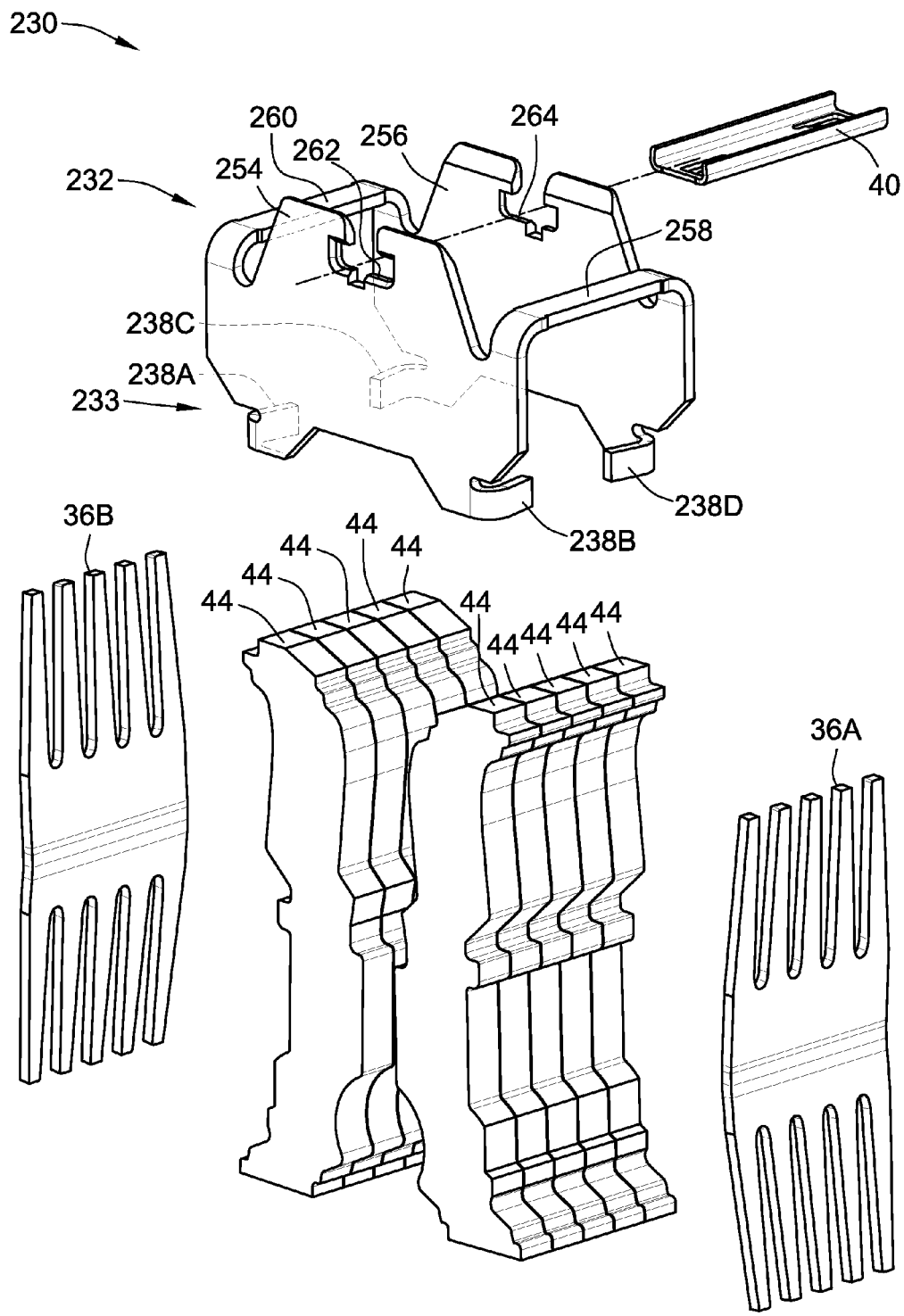
FIG. 9 is an exploded perspective-view illustration of the self-locking power connector of FIG. 8.

With reference now to FIGS. 8 and 9, wherein like reference numerals refer to like components from FIGS. 2-4, an exemplary power connector, indicated generally at 230, is presented in accordance with aspects of the present disclosure. The power connector 230 includes a slidable cage 232, a cluster, which is designated generally as 34, one or more dual-fork-shaped leaf springs 36A and 36B, one or more retaining members 238A-D (best seen in FIGS. 9 and 10), and an elongated, U-shaped spacer 40. Like the embodiment of FIGS. 4-7, the cluster 34 (including the stacks 42A, 42B of fingers 44), leaf springs 36A, 36B, and spacer 40 of the embodiment illustrated in FIGS. 9-11 can be structurally and functionally identical to the cluster 34, leaf springs 36A, 36B, and spacer 40 of FIGS. 2 and 3. In alternative configurations, however, the cluster 34, leaf springs 36A, 36B, and spacer 40 can be individually or collectively varied in structure and/or function.

Figure 10:
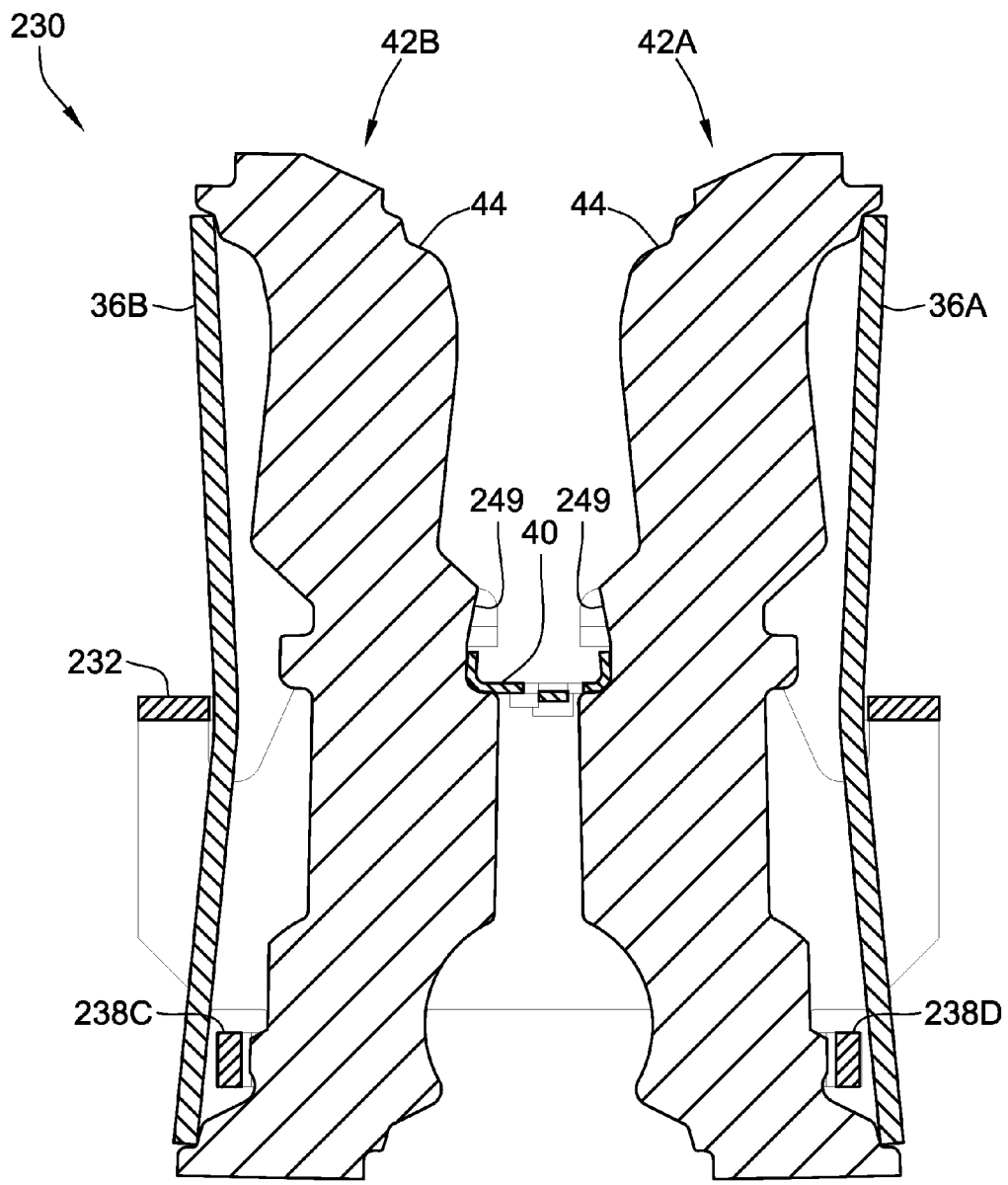
FIG. 10 is a front-view illustration of the self-locking power connector of FIG. 8 shown in partial cross-section with a slidable cage in a locking position.
Figure 11:
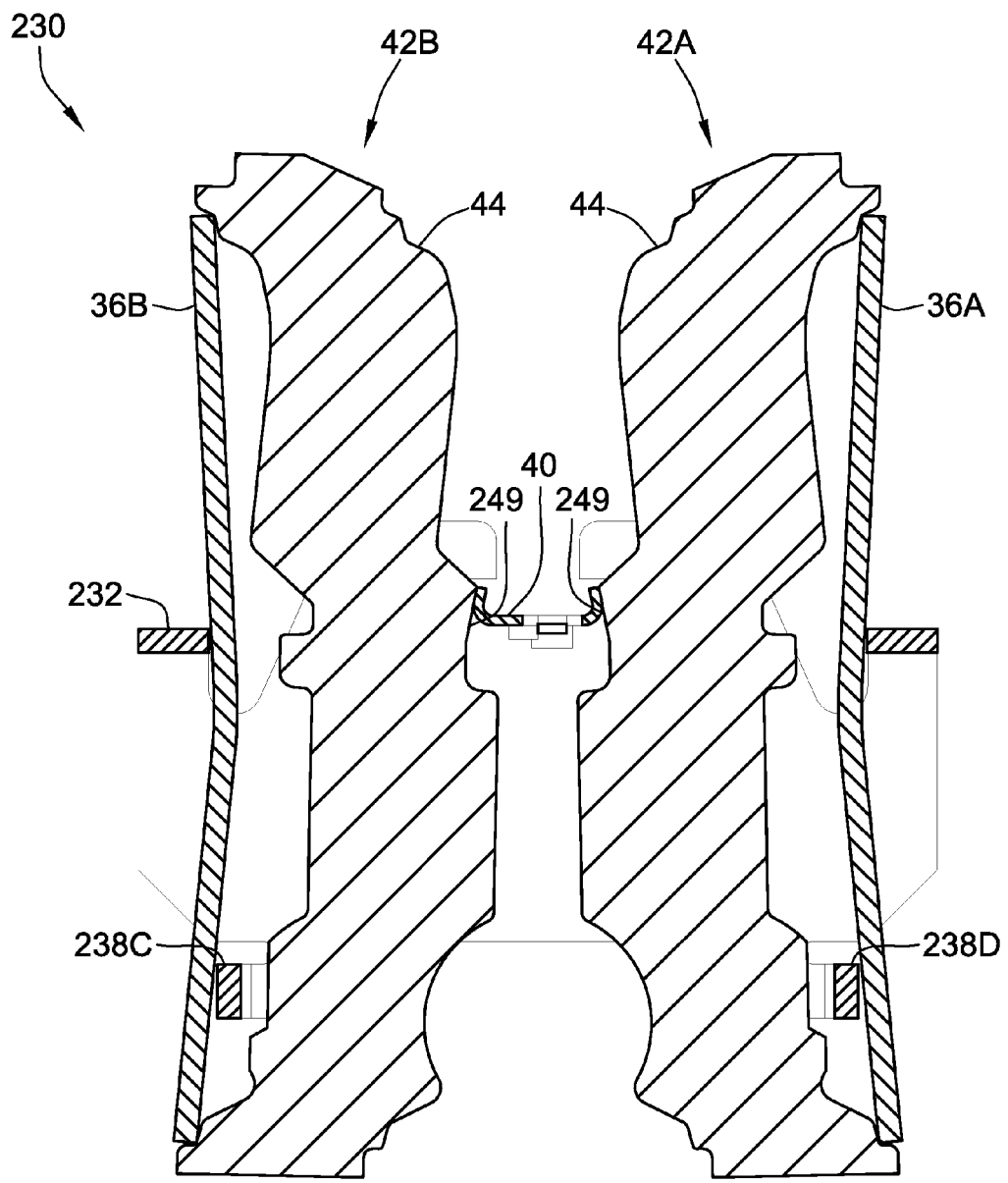
FIG. 11 is a front-view illustration of the self-locking power connector of FIG. 8 shown in partial cross-section with the slidable cage in an unlocking position.

Like the cage 32 of FIGS. 2 and 3, the cage 232 of the connector 230 illustrated in FIGS. 9-11 acts as a functional sleeve or casing, extending generally continuously around the outer perimeter of the cluster 34 to thereby maintain the fingers 44 in their respective stacks 42A, 42B. The cage 232 can be a single-piece, monolithic structure that is fabricated (e.g. stamped) from a structurally appropriate, non-magnetic material, such as brass or stainless steel. The cage 232 includes first and second opposing, generally flat end walls 254 and 256, respectively, that are attached together via first and second elongated connecting arms 258 and 260, respectively, that extend between and are generally perpendicular to the end walls 54, 56. The two stacks of fingers 42A, 42B nest within the cage 32, as seen in FIG. 8, with a first ("forwardmost") pair of fingers 44 laying generally parallel to and flat against the first end wall 54, and a second ("rearward-most") pair of fingers 44 laying generally parallel to and flat against the second end wall 56. Each of the end walls 254, 256 includes a respective window 262 and 264. When assembling the connector 230, the first and second stacks 42A, 42B are positioned inside the cage 32 and positioned such that the notches 48 align to cooperatively define a channel, which is then lined up with the windows 262, 264. The spacer 40 is then inserted through one of the windows 262, 264, through the notches 48 between the opposing stacks of fingers 42A and 42B, to the other window 262, 264. In this manner, the spacer 40 pivotably attaches the fingers 44 to the cage 232 and maintains a space between the stacks of fingers 42A and 42B.

The power connector 230 can be self-locking in that it can achieve and maintain a locked position without external features. For example, the power connector 230 can provide "fastener grade" retention without using fasteners, clamps, or other separate attachment means, which requires fewer parts, reduces complexity, and reduces labor costs. In the exemplary embodiment of FIGS. 8-11, the cage 232 of the power connector 230 includes a plurality of retaining members 238A-D, each of which is operatively engaged with the cage 232 and one or more of the fingers 44. The retaining members 238A-D are designed to prevent a compressive force applied to the upper end portions 45 of the opposing pairs of fingers 44 from separating the lower end portions 43 of the fingers 44, thereby hampering inadvertent removal of the connector 30 from the cluster support bar 20A-C. Each of the retaining members 238A-D is a flange-like tab that projects generally perpendicularly from a respective corner of a "lower" end portion 233 of the cage 232, extending between a respective one of the dual-fork-shaped leaf springs 36A, 36B and one or more of the fingers 44. In the illustrated embodiment, a first retaining member 238A is generally coplanar with a third retaining member 238C, and generally parallel with a second 238B and a fourth retaining member 238D (the retaining members 238A-D also referred to herein as "flanges"). Likewise, the second retaining member 238B is generally coplanar with the fourth retaining member 238D, and generally parallel with the first and third retaining members 238A, 238C. When the cage 232 is operatively oriented, the retaining members 238A-D are positioned adjacent the lower portions of the stacked fingers 44, as seen in FIG. 8.

The retaining members 238A-D cooperate to selectively inhibit or otherwise prevent the lower portions of the fingers 44 from being readily urged laterally away from one another, e.g., when a compressive force is applied to the upper end of the connector 230. In particular, the cage 232 is slidably mounted to the fingers 44 such that the cage 232 can be selectively moved between a locking position, illustrated for descriptive purposes in FIG. 10, and an unlocking position, illustrated for descriptive purposes in FIG. 11. In some configurations, each finger 44 includes a tapered surface 249, which acts to "downwardly" bias and hold the cage 232 in the locking position. For instance, the upward motion of the spacer 040 along the tapered surfaces 249 will also compel the upper positions of the fingers 44 to move laterally away from each other, which in turn increases the deflection and hence the force of the dual-forked springs 36A-B. This increase in force, combined with the inclination of the tapered surfaces 249, creates a "downward" biasing force that urges and holds the cage 232 in the locking position. When the cage 232 is in the locking position, the flanges 238A-D wrap around one or more of the fingers 44 and obstruct movement of the lower end portions 43 of the fingers 44. In essence, the flanges 238A-D act like clamps that press together the lower ends of the first and second stacks 42A, 42B of fingers 44. In some embodiments, the first and second connecting arms 258 and 260 are configured to mate with a tool, which is operable to slide the cage 232 to the unlocking position—e.g., in a direction away from the pivot (e.g., 22A-C of FIG. 1), to allow the fingers 44 to be separated such that the cluster 34 can be pressed onto or removed from a pivot 22A-F. When the cage 232 is moved to the unlocking position, as seen in FIG. 11, the flanges 238A-D are displaced "upwardly" thereby allowing the lower end portions 43 of the fingers 44 to be urged apart, e.g., via a compressive force applied to the upper end portions 45 of the fingers 44.

Figure 12:
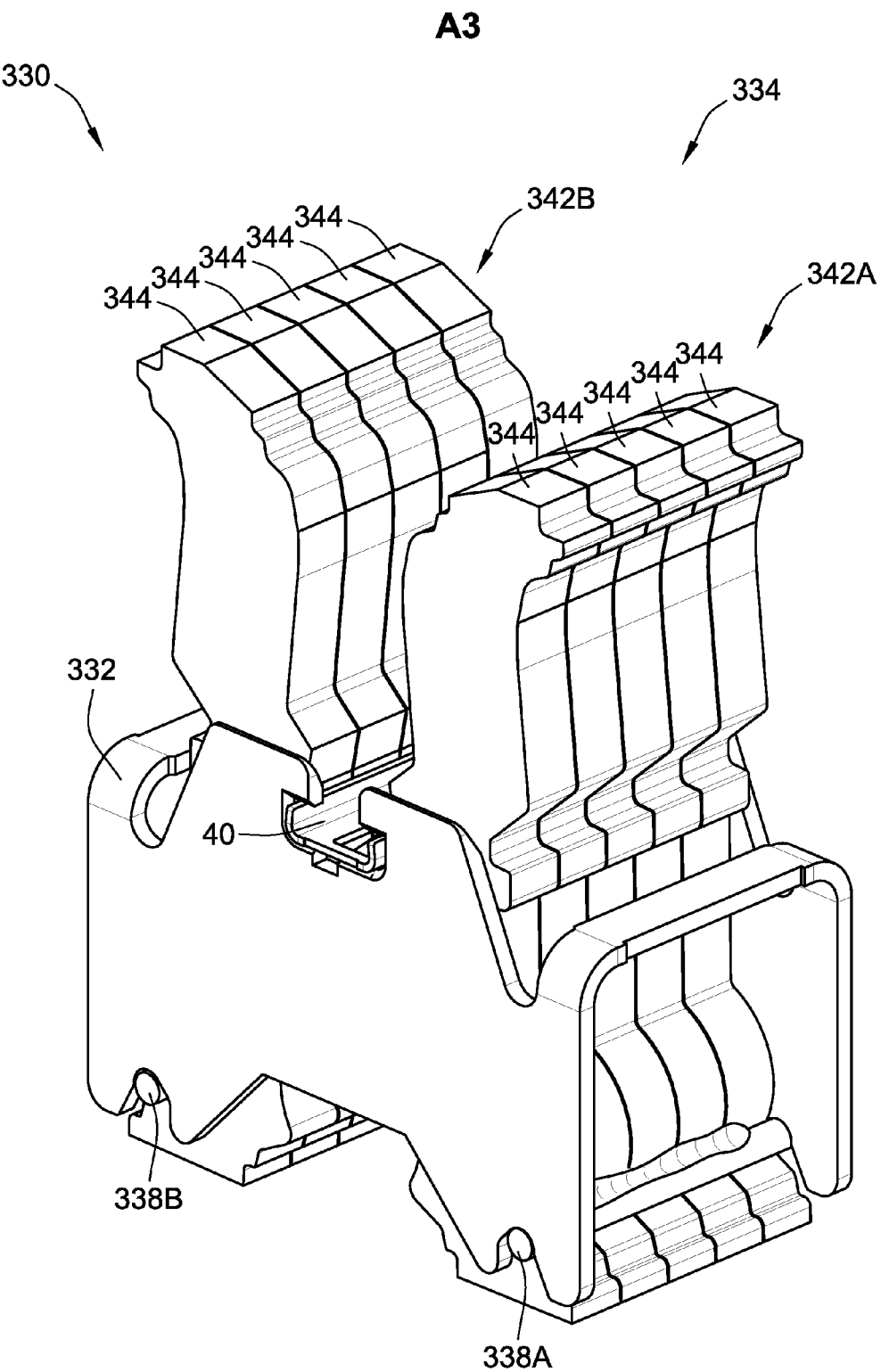
FIG. 12 is a perspective-view illustration of yet another exemplary self-locking power connector in accordance with aspects of the present disclosure.
Figure 13:
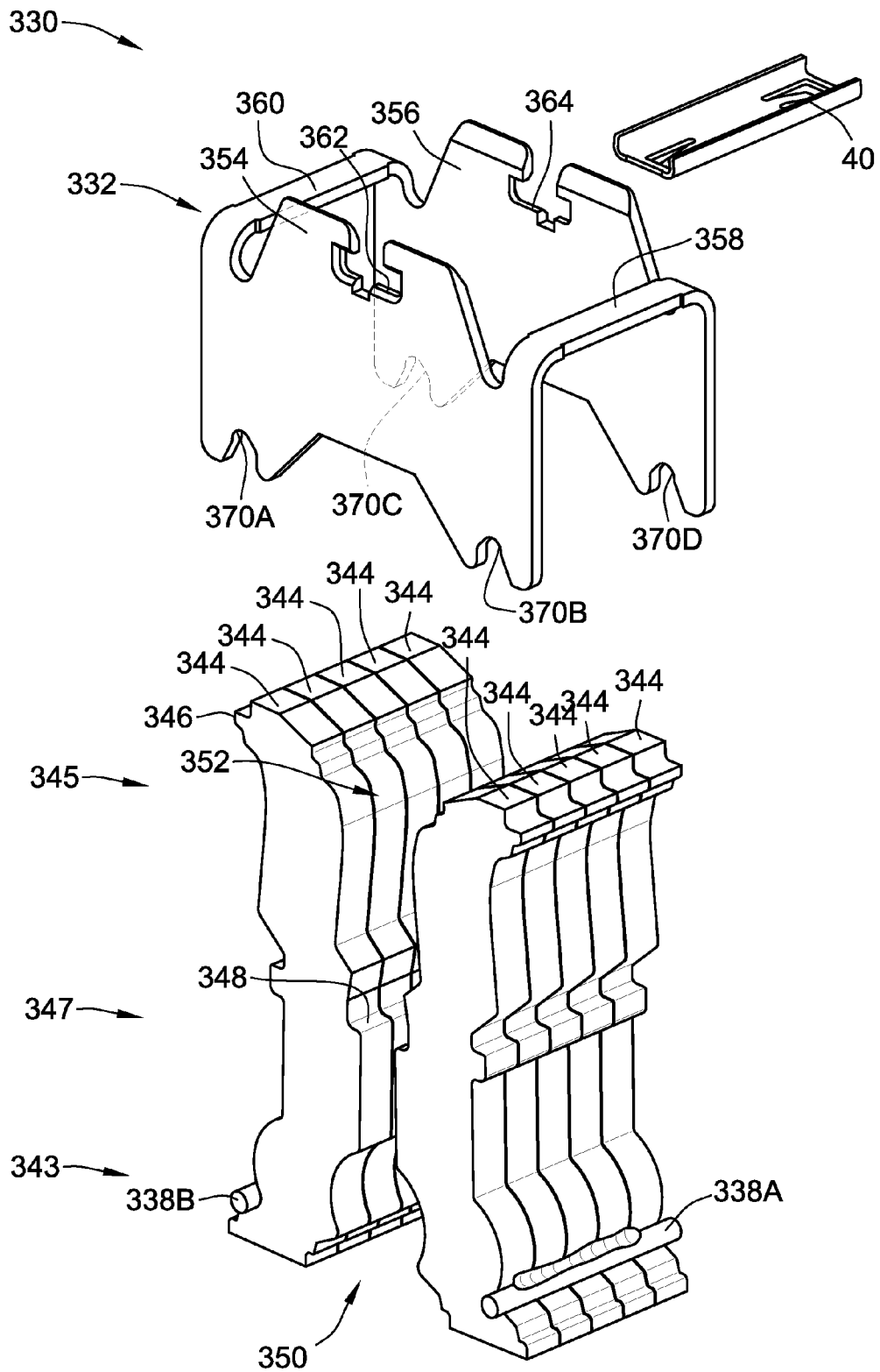
FIG. 13 is an exploded perspective-view illustration of the self-locking power connector of FIG. 12.

Turning next to FIGS. 12 and 13, an exemplary power connector, indicated generally at 330, is presented in accordance with aspects of the present disclosure. The power connector 230 includes a slidable cage 332, a finger cluster, which is designated generally as 334, one or more retaining members 338A-B, and an elongated, U-shaped spacer 40. Like the embodiment illustrated in FIGS. 2 and 3, the cluster 334 generally comprises first and second opposing stacks 342A and 342B, respectively, of electrically conductive, elongated, asymmetric plates 344 (also referred to herein as "fingers"). The plates 344 are mated in opposing pairs and pivotably mounted to the cage 332, for example, via spacer 40.

Figure 14:
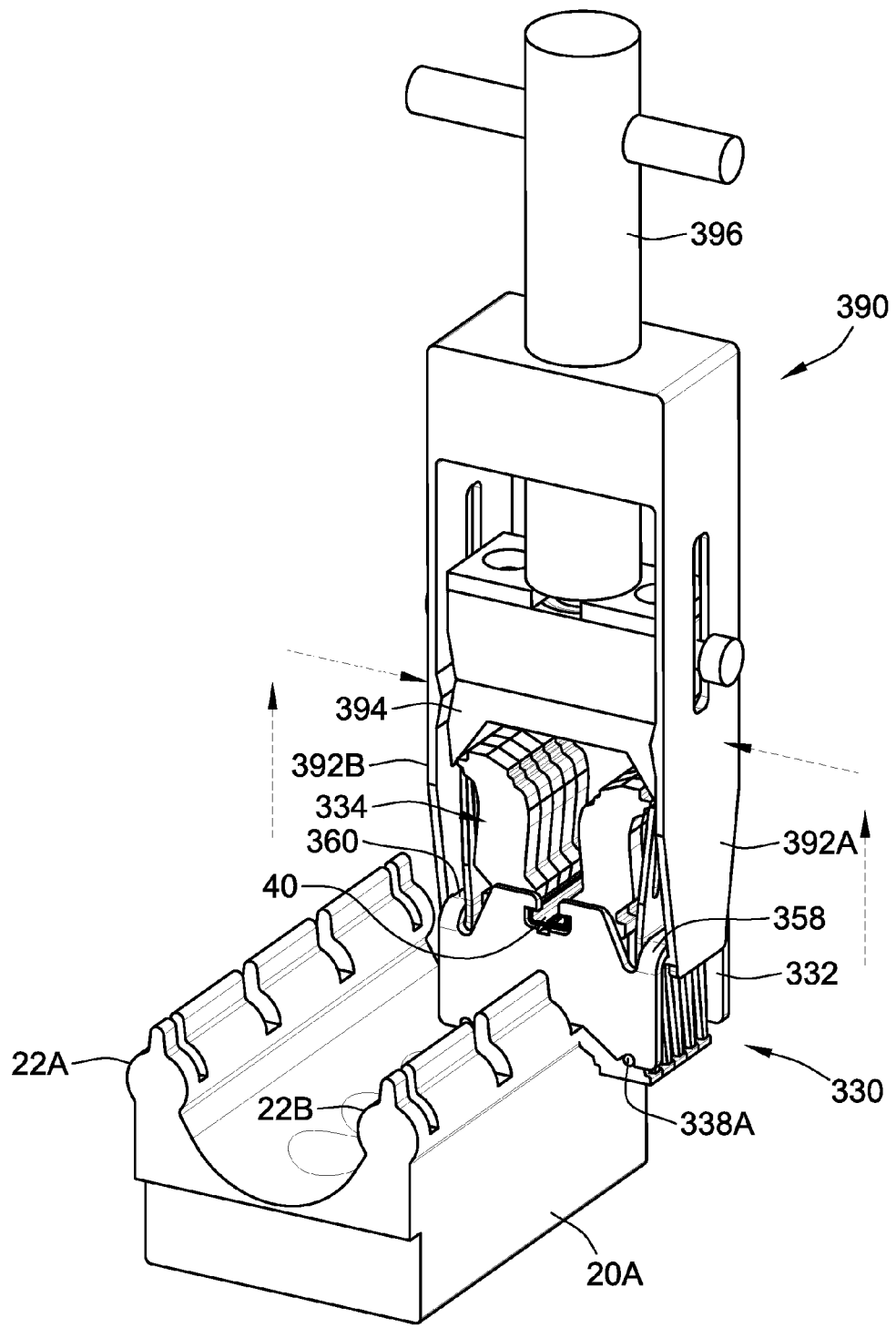
FIG. 14 is a perspective view illustration of an exemplary tool for selectively attaching and detaching the self-locking power connector of FIG. 12 to and from a cluster support of a circuit breaker.
Figure 15:
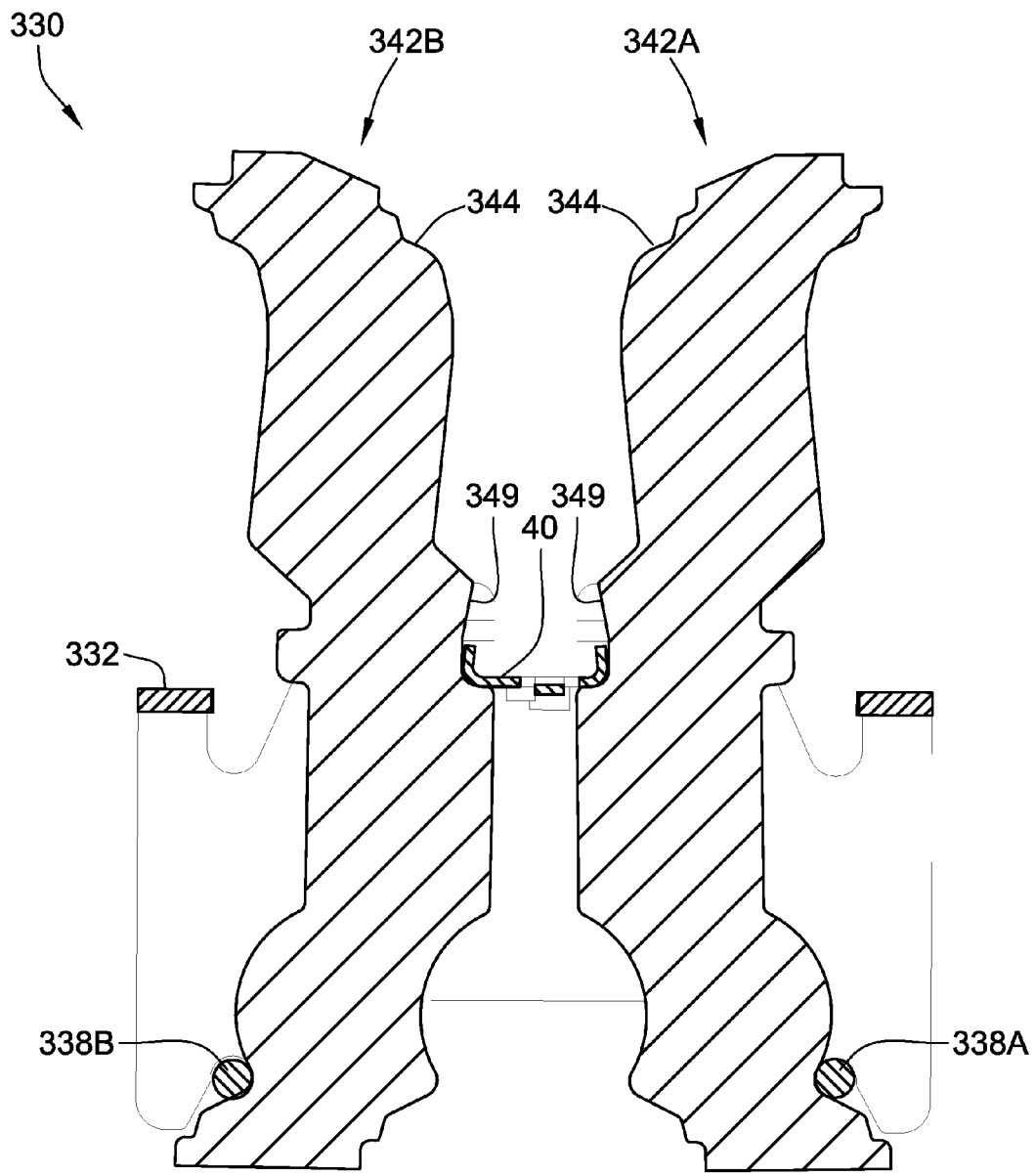
FIG. 15 is a front-view illustration of the self-locking power connector of FIG. 8 shown in partial cross-section with a slidable cage in a locking position.

In some embodiments, the plates 344 are substantially structurally identical. However, in alternate configurations, the plates 344 may be individually or collectively varied in shape and size from that which is shown in the drawings. Each plate 344 can be a single-piece, monolithic structure that is fabricated (e.g., stamped) from an electrically conductive material, such as aluminum or copper. Each plate 344 has a first ("lower") end portion 343 opposing a second ("upper") end portion 345, the end portions 343, 345 being interconnected by a middle portion 347. A tab 346 projects laterally outward from the second end portion 345 such that the tab 346 can be received in and mate with a tool 390, an exemplary embodiment of which is shown in FIG. 14. Each of the middle portions 347 includes a notch 348; when mated in opposing pairs, the notches 348 cooperatively define an elongated channel within which is received the spacer 40. The spacer 40, in turn, is attached to the cage 332 to thereby pivotably mount the opposing stacks of plates 342A and 342B to the cage 332.

The first end portion 343 of each plate 344 is configured to attach to a cluster support 20A-C of the circuit breaker 10, whereas the second end portion 345 of each plate 344 is configured to electrically mate with the bus bar 14. By way of non-limiting example, the lower end portions 343 of each mating pair of opposing fingers 344 are shaped to cooperatively define a spade-shaped channel (generally designated by reference numeral 350 in FIG. 13) with the same general longitudinal profile as the spade-shaped pivots 22A-F such that the first end portions 343 can securely seat on and straddle one of the cluster supports 20A-C of the circuit breaker 10. In a similar regard, the upper end portions 345 of each mating pair of opposing fingers 344 are shaped to cooperatively define a channel (generally designated by reference numeral 352 in FIG. 13) with a complementary longitudinal profile for receiving one of the tangs 15 of the bus bar 14.

Like the various cage designs described hereinabove, the cage 332 of FIGS. 12 and 13 acts as a functional sleeve or casing, extending generally continuously around the outer perimeter of the cluster 334 to thereby maintain the fingers 344 in their respective stacks 342A, 342B. The cage 332 can be a single-piece, monolithic structure that is fabricated (e.g. stamped) from a structurally appropriate, non-magnetic material, such as brass or stainless steel. The cage 332 includes first and second opposing, generally flat end walls 354 and 356, respectively, that are attached together via first and second elongated connecting arms 358 and 360, respectively, that extend between and are generally perpendicular to the end walls 354, 356. The two stacks of fingers 342A, 342B nest within the cage 332, as seen in FIG. 12, with a first ("forward-most") pair of fingers 344 laying generally parallel to and flat against the first end wall 354, and a second ("rearward-most") pair of fingers 344 laying generally parallel to and flat against the second end wall 356. Each of the end walls 354, 356 includes a respective window 362 and 364. When assembling the connector 330, the stacks 342A, 342B are positioned inside the cage 332 and oriented such that the notches 348 align to cooperatively define a channel, which is lined up with the windows 362, 364. The spacer 40 is inserted through one of the windows 362, 364, through the notches 348, to the other window 362, 364, thereby pivotably attaching the fingers 344 to the cage 332.

The power connector 330 can be self-locking in that it can achieve and maintain a locked position without the incorporation of external features. In the embodiment exemplified in FIGS. 12-16, the power connector 330 includes a pair of retaining members 338A, 338B, each of which is operatively engaged with the cage 332 and one or more of the fingers 344. The retaining members 338A, 338B are designed to prevent the lower end portions 343 of the opposing pairs of fingers 344 from being separated, thereby hampering inadvertent removal of the connector 330 from the cluster support bar 20A-C. Each of the retaining members 338A, 338B in FIGS. 12-16 is an elongated, generally cylindrical retention pin that extends longitudinally across the lower end portions 343 of the fingers 344. In some embodiments, each retention pin 338A, 338B can be rigidly attached (e.g., welded or adhered) to a respective stack 342A, 342B of fingers 344, whereby the lower end portions 343 are permanently attached together.

Figure 16:
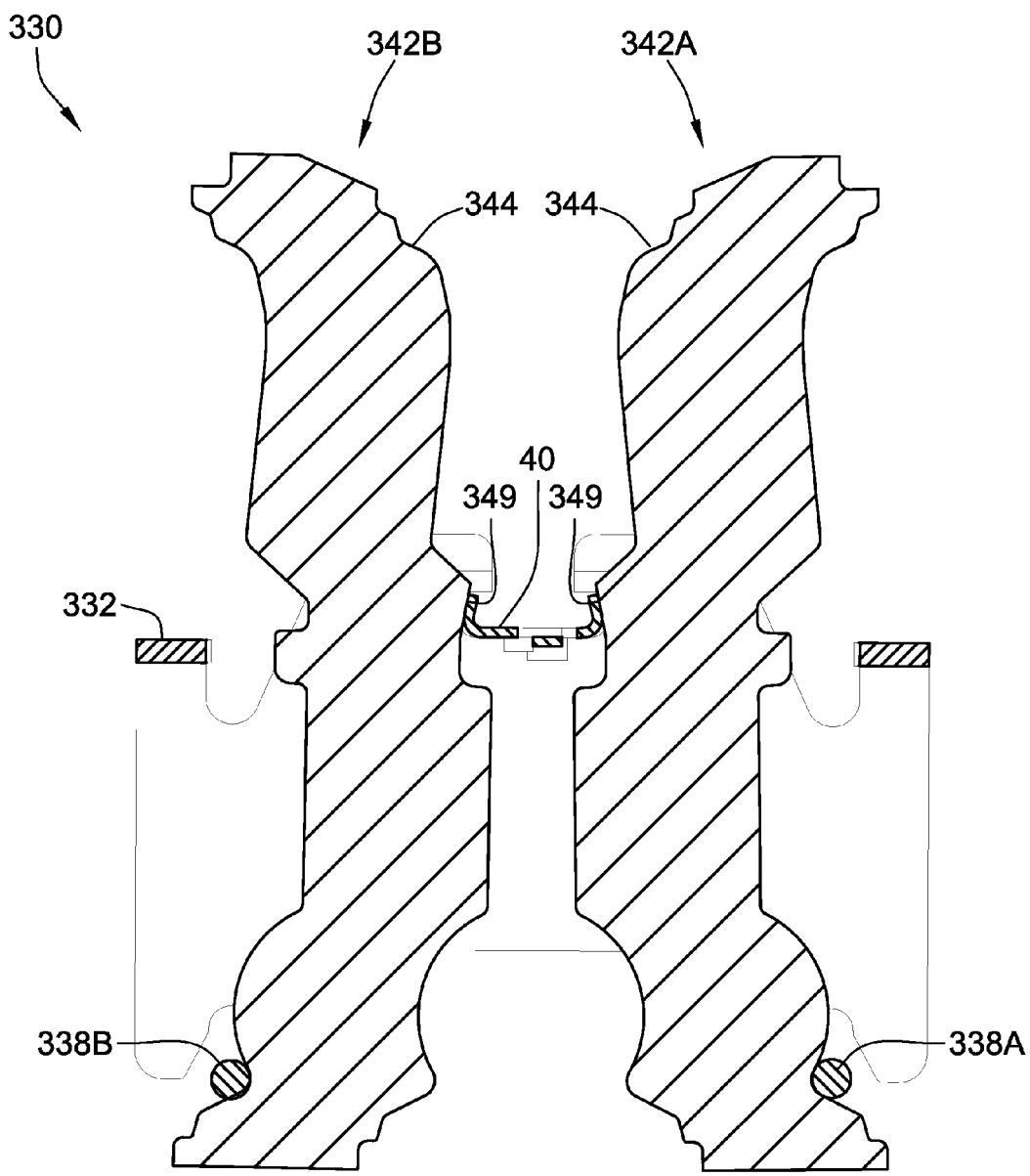
FIG. 16 is a front-view illustration of the self-locking power connector of FIG. 8 shown in partial cross-section with the slidable cage in an unlocking position.

As seen in FIG. 16, the retention pins 338A, 338B inhibit or otherwise prevent the lower portions of the fingers 44 from being readily urged laterally away from one another. By way of non-limiting example, the cage 332 is slidably mounted to the fingers 344 such that the cage 332 can be selectively moved between a locking position, illustrated for explanatory purposes in FIG. 15, and an unlocking position, illustrated for explanatory purposes in FIG. 16. Proximate the notch 348 of each finger 344 is a tapered surface 349 configured to effect a "downward" bias on the cage 232. In particular, moving the cage 332 "upwards" toward the second end 345 of the fingers 344 will concomitantly slide the spacer 40 "upwards" along the tapered surfaces 349. Reactively, the inclination of the tapered surfaces 349 creates a "downward" biasing force that "presses" back against the tapered surfaces 349, which in turn creates a "downward" biasing force that urges and holds the cage 232 in the locking position. When the cage 332 is in the locking position, the first retention pin 338A mates with (i.e., is received in) two complementary pin slots 370A and 370C, each of which is formed proximate a respective corner of the lower end portion of a cage wall 354, 356, while the second retention pin 338B mates with (i.e., is received in) two complementary pin slots 370B and 370D, each of which is formed proximate a respective corner of the lower end portion of a cage wall 354, 356. The cooperative interplay between the retention pins 338A, 338B and their respective pin slots 370A-D prevents the lower end portions 343 of the fingers 344 from being urged apart.

As seen in FIG. 14, the first and second connecting arms 358 and 360 are configured to mate with a tool 390. In particular, the tool 390 has two laterally adjacent clamping arms 392A and 392B, respectively, each of which clamps onto and grabs a respective one of the connecting arms 358 and 360. In addition, a locking jaw 394 fits around the upper end portions 345 of the fingers 344 (e.g., clamping onto and grabbing the tabs 346). By rotating an activation arm 396, a compressive force is applied to the upper end portions 345 of the fingers 344 vice grip 394, while concurrently drawing the slidable cage 332 away from the pivot 22B of the cluster support bar 20A. This will slide the cage 332 to the unlocking position—e.g., in a direction away from the pivot, to allow the fingers 344 to be separated such that the cluster 334 can be pressed onto or removed from a pivot 22B. That is, when the cage 332 is moved to the unlocking position, the pins 338A, 338B are displaced from their respective pin slots 370A-D, as seen in FIG. 16, which allows the lower end portions 343 of the fingers 344 to be urged apart.

An advantage of some of the above connector configurations 30, 130, 230, 330 is the ability to increase the retention force of the pivoting finger cluster by at least one order of magnitude (e.g., provide "fastener grade" retention) over prior-art designs without the use of fasteners or clamps. This, in turn, prevents the connector from being inadvertently dislodged from a corresponding cluster support. In some embodiments, the connector creates an effective "lock" that will require the permanent deformation of parts to defeat. A benefit of this approach is that the cluster is biased by force orientation of the frame towards a locked condition and, thus, can neither be installed nor removed without a special tool. This can help reduce the incidence of spring overstressing in the field because the cluster generally cannot be removed with just human fingers.

While particular aspects, embodiments, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the invention as defined in the appended claims.

What is claimed is:

1. A self-locking power connector for connecting a circuit breaker to an electrically conductive bus bar, the circuit breaker having a cluster support, the connector comprising:
   a cage;
   a cluster including opposing pairs of electrically conductive fingers pivotably mounted to the cage, each finger having opposing upper and lower end portions, the lower end portion of each finger being configured to straddle the cluster support of the circuit breaker;
   first and second spring members biasing the lower end portions of the opposing pairs of fingers toward one another; and
   a retaining member operatively engaged with the cage and the cluster, the retaining member being configured to inhibit a compressive force applied to the upper end portions of the opposing pairs of fingers from urging apart the lower end portions of the opposing pairs of fingers.

2. The connector of claim 1, wherein the retaining member is positioned between an end surface of one or more of the fingers and an inner surface of the cage.

3. The connector of claim 1, wherein the retaining member includes a tab positioned between an outer facing surface of one or more of the fingers and the first spring member such that the tab inhibits the lower finger portions of the one or more fingers from being urged apart.

4. The power connector of claim 1, wherein the retaining member includes a leaf spring that extends across a gap between the opposing pairs of fingers.

5. The connector of claim 1, wherein the upper end portions of the fingers are configured to straddle the electrically conductive bus bar.

6. The connector of claim 1, further comprising:
   a spacer attached to the cage and positioned between the opposing pairs of fingers, the spacer maintaining a space between the opposing pairs of fingers.

7. The connector of claim 1, wherein the retaining member includes a spring clip having a leaf spring spanning across a space between the opposing pairs of fingers, the leaf spring restricting the lower finger portions from being urged away from one another.

8. The connector of claim 7, wherein the spring clip includes first and second opposing wings attached together via the leaf spring, each of the wings being interposed between the cage and one or more of the fingers.

9. The connector of claim 8, wherein the spring clip has upper and lower end portions, the lower end portion of the spring clip being configured to straddle the cluster support and thereby operatively attach the spring clip to the circuit breaker.

10. The connector of claim 9, wherein the upper end portion of the spring clip is positioned such that a compressive force applied to the upper end portions of the pairs of fingers also presses against the upper end portion of the spring clip, the leaf spring responsively generating a spring force operable to at least partially counteract the applied compressive force.

11. The connector of claim 1, wherein the retaining member includes a first frame slidably positioned between the cage and a first pair of the opposing pairs of fingers, the first frame being slidable between a locking position, whereat one or more tabs extending from the first frame obstruct moving the lower end portions of the first pair of fingers apart, and an unlocking position, whereat the one or more tabs are displaced thereby allowing the lower end portions of the first pair of fingers to be urged apart.

12. The connector of claim 11, wherein each of the one or more tabs projects generally perpendicularly from the first frame and extends between one of the first and second spring members and one or more of the fingers.

13. The connector of claim 12, wherein the one or more tabs includes a first tab positioned adjacent the lower end portion of the finger and a second tab positioned adjacent a middle portion of the finger, the middle portion being between the upper and lower end portions of the finger.

14. The connector of claim 11, wherein the retaining member includes a second frame slidably positioned between the cage and a second pair of the opposing pairs of fingers, the second frame being slidable between a second locking position, whereat one or more tabs extending from the second frame obstruct moving the lower end portions of the second pair of fingers from being apart, and a second unlocking position, whereat the one or more tabs are displaced thereby allowing the lower end portions of the second pair of fingers to be urged apart.

15. The connector of claim 12, wherein:
   the first frame has a first set of tool-engaging tabs projecting away from the interior of the cage, the first set of tool-engaging tabs being configured to mate with a tool, and
   the second frame has a second set of tool-engaging tabs projecting away from the interior of the cage, the second set of tool-engaging tabs being configured to mate with the tool,
   the tool is operable to concomitantly slide the first frame to the unlocking position and slide the second frame to the second unlocking position.

16. The connector of claim 12, wherein:
the first and second pairs of fingers have corresponding facing surfaces facing each other and corresponding end surfaces facing respective inner surfaces of the cage,
the first frame is positioned between the respective inner surface of the cage and the end surfaces of the first pair of fingers,
the second frame is positioned between the respective inner surface of the cage and the end surfaces of the second pair of fingers.

17. The connector of claim 1, wherein the retaining member includes one or more flanges projecting from the cage, the cage being slidable between a locking position, whereat the flanges obstruct moving the lower end portions of the one or more fingers apart, and an unlocking position, whereat the one or more flanges are displaced thereby allowing the lower end portions of the one or more fingers to be urged apart.

18. The connector of claim 1, wherein the retaining member includes one or more retention pins extending across the lower end portions of the fingers, the cage being slidable between a locking position, whereat the one or more pins cooperatively mate with a slot in the cage to prevent the lower end portions of the one or more fingers from being urged apart, and an unlocking position, whereat the one or more pins are displaced from the slot allowing the lower end portions of the one or more fingers to be urged apart.

19. The connector of claim 1, wherein the cage includes first and second end walls attached together via first and second connecting arms extending between the first and second end walls.

20. A power connector for electrically coupling a circuit breaker to an electrically conductive power bus bar, the circuit breaker having a cluster support protruding therefrom, the power connector comprising:
a cage;
first and second opposing stacks of electrically conductive asymmetric plates pivotably attached to the cage, each plate having opposing first and second end portions, the first end portions being configured to attach to the cluster support of the circuit breaker, and the second end portions being configured to electrically mate with the bus bar;
first and second biasing members each engaged with a respective one of the stacks of plates, the first and second biasing members cooperatively biasing the first end portions of the first and second opposing stacks of plates towards one another; and
a retaining member engaged with the cage and the first and second opposing stacks of plates, the retaining member inhibiting the first end portions of the first and second opposing stacks of plates from being urged away from one another.

* * * * *